United States Patent [19]

Baligant

[11] 3,952,289
[45] Apr. 20, 1976

[54] CONTROLLER FOR LINKING A TYPEWRITER CONSOLE TO A PROCESSOR UNIT

[75] Inventor: Jacques A. Baligant, Brussels, Belgium

[73] Assignee: Burroughs Corporation, Detroit, Mich.

[22] Filed: Feb. 3, 1975

[21] Appl. No.: 546,713

[52] U.S. Cl. ............................................. 340/172.5
[51] Int. Cl.² ............................................ G06F 3/10
[58] Field of Search ................... 340/172.5; 197/1

[56] References Cited
UNITED STATES PATENTS

| | | | |
|---|---|---|---|
| 3,440,613 | 4/1969 | Vercellotti et al. | 340/172.5 |
| 3,815,104 | 6/1974 | Goldman | 340/172.5 |
| 3,848,232 | 11/1974 | Leibler et al. | 340/172.5 |
| 3,872,444 | 3/1975 | Cleveland et al. | 340/172.5 |

*Primary Examiner*—Joseph F. Ruggiero
*Attorney, Agent, or Firm*—Benjamin J. Barish; Karl Stoess; William B. Penn

[57] ABSTRACT

A controller implemented on a single LSI MOS chip is described for linking a typewriter console to a processor unit. The controller comprises a FIFO (First-In-First-Out) buffer for storing the keyboard data characters read-out from the console. The buffer includes a flag for each stage, each flag being controlled to assume a first condition when its respective stage is occupied by a character, and a second condition when it is vacant of a character. The keyboard data characters are inputted into the first stage by strobe pulses, and are continuously shifted by high-speed clock pulses to the highest stage of the buffer whose flag is in the stage-vacant condition, the characters being read-out from the last stage. The buffer includes means for preventing the entry of a new character, and also for providing an indication of an "Overflow" condition, whenever a strobe pulse is received by the buffer while the first-stage flag of the buffer is in the stage-occupied condition.

The described controller also includes a plurality of registers for storing indicator data to be used for driving keyboard indicators, and an arrangement for multiplexing the indicator registers according to one of three pre-selected modes, depending on the number of indicators to be driven. Further included in the described controller is an arrangement for reading-out the keyboard switches to the processor unit.

18 Claims, 13 Drawing Figures

FIFOMTY = AFF.BFF.CFF.DFF

TIMING DIAGRAM—KEYBOARD BUFFER (FIFO)

FIG.9 KEYBOARD TIMING DIAGRAM

FIG.10 SWITCH TIMING DIAGRAM

CONTROLLER FOR LINKING A TYPEWRITER CONSOLE TO A PROCESSOR UNIT

BACKGROUND OF THE INVENTION

The present invention relates to data processing systems equipped with a typewriter console including a keyboard, switches and indicators. The invention itself is primarily directed to the controller for linking such a console to the processor to enable the bidirectional transfer of informational and control data between the two.

The invention is particularly useful, and is therefore described below, with respect to a controller providing a link between a typewriter console and a processor, such as a central processing unit or a terminal processing unit which may be operated on-line to transfer information through a data communication facility, or off-line to serve as an electrical typewriter.

BRIEF SUMMARY OF THE INVENTION

According to one feature of the present invention, the controller includes a First-In-First-Out (FIFO) storage buffer for receiving the keyboard data characters. Each stage of the buffer has a flag which assumes a first condition (e.g., "reset") when its respective stage is occupied by a character, and a second condition (e.g., "set") when its respective stage is vacant of a character. The keyboard data characters are read into the first stage of the buffer by strobe pulses, and are immediately caused to migrate towards the last stage of the buffer by high-speed clock pulses, each character being stored in the highest stage of the buffer whose flage is in the stage-vacant condition. The characters are serially read-out of the buffer from the last stage, and as each character is read-out, the other stored characters are immediately clock-shifted towards the last stage. The controller includes an arrangement for preventing the entry of further characters and for providing an indication, preferably by a "blinking" indicator lamp to indicate an "Overflow" condition, whenever a strobe pulse is received by the buffer while the flag of the first stage of the buffer is in the stage-occupied condition.

According to further features of the invention, the controller further includes means sensing the condition of the flag in the highest stage of the buffer, said latter means enabling the read-out from the buffer when said flag is in the stage-occupied condition, and terminating the read-out from the buffer when said flag is in the stage-vacant condition. The last-mentioned means, when the highest stage flag is in the stage-vacant condition, causes the controller to automatically inform the central facility as to whether the typewriter terminal is in an "Overflow" condition with respect to said buffer.

According to a further feature, the controller includes decoder means for decoding a "Keyboard-Select" instruction from the processor unit enabling the read-in with a strobe pulse of a character from the keyboard into the first stage of the buffer. The decoder further includes means for decoding a "Read-Enabling" instruction and a subsequent "Read" instruction from the processor unit to effect the serial read-out of the characters from the last stage of the buffer to the processor unit.

According to still further features of the invention, the controller includes a plurality of registers for receiving indicator data from the processor unit to be transferred to indicators in the typewriter terminal. The indicator data is transferred by a multiplexer which scans the indicator registers and read-out their contents to the indicators. The controller includes an arrangement for selectively operating the multiplexer according to a first mode wherein the contents of only one register are read-out to the indicators, a second mode wherein only certain ones of the registers are scanned, or a third mode wherein all the registers are scanned, depending upon the number of indicators to be driven. The multiplexer is caused to scan at a faster scanning rate and with shorter sampling periods when operated according to the second mode than when operated according to the third mode.

The controller described further includes a decoder for decoding an "Enabling" instruction and a subsequent "Read" instruction from the processor unit to effect a read-out of typewriter switches to the processor unit.

An important advantage of the controller described is that it can be implemented on a single LSI MOS (Large-Scale-Integration, Metal-Oxide-Semiconductor) circuit chip.

Further features and advantages of the invention will be apparent from the description below.

BRIEF DESCRIPTION OF THE DRAWINGS

The invention is herein described, by way of example only, with reference to a preferred embodiment involving a controller providing a link between a terminal processor unit and a typewriter console which may be operated on-line to transfer information to or from the central processing unit or off-line to function as an electrical typewriter. In the drawings illustrating the preferred embodiment.

DESCRIPTION OF THE PREFERRED EMBODIMENT

1. General System

Figure 1:
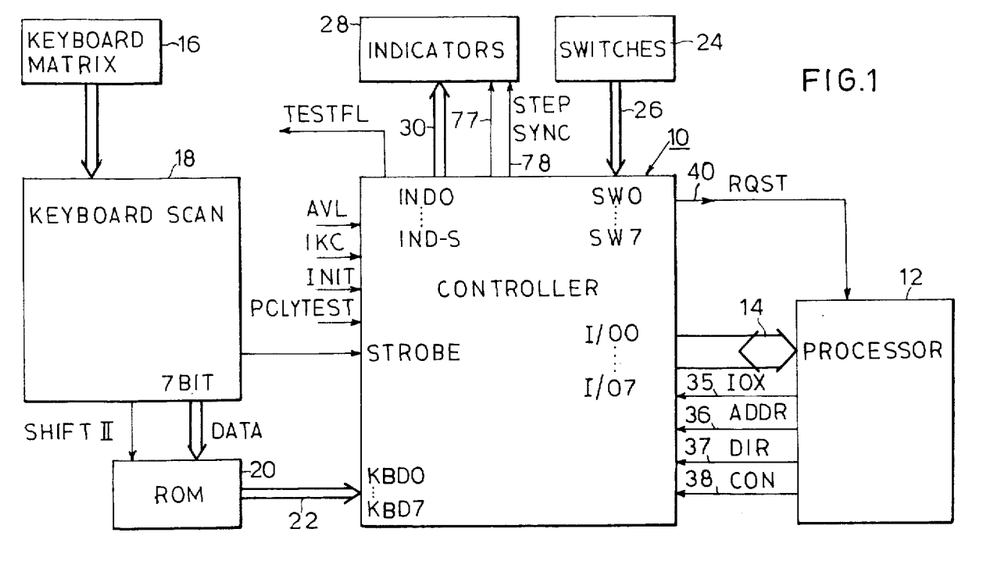
FIG. 1 is a general block diagram illustrating the controller and its various inputs and outputs.

The overall system of the described preferred embodiment of the invention is shown in the general block diagram of FIG. 1. As indicated above, this embodiment is a controller generally designated 10, providing a link between a terminal processor unit 12 and a typewriter console which may be operated on-line to transfer information to or from the processor, or off-line to serve as an electrical typewriter. The controller, in this described embodiment, is implemented on a single-chip, Large-Scale-Integration, Metal-Oxide-Semiconductor (LSI MOS) circuit.

The main communication between controller 10 and processor 12 is provided by an 8-bit bidirectional highway or bus 14. The input-output information on highway 14 appears as signals I/00–I/07, and may be control data or informational data, as will be described more particularly below.

The typewriter terminal includes a known electronic keyboard assembly of the type having a keyboard matrix 16 and a keyboard scanning device 18. The keyboard character data is transmitted from the scanning device 18 to the controller via a code-conversion read-only-memory (ROM) 20 and an 8-bit bus 22. This keyboard character data appears as 8-bit signals KBD0–KBD7 inputted into controller 10, from which it is transmitted to processor 12 via the bidirectional 8-bit highway 14.

The typewriter terminal further includes a plurality of switches 24, (e.g., eight toggle and/or push button switches) presettable to select various operational modes or controls, e.g., "On-Line, Off-Line" mode, "Full-Duplex, Half-Duplex" mode, and the like. The conditions of switches 24 are inputted as signals SW0–SW7 into controller 10 via an 8-bit bus 26, and are read-out from controller 10 into processor 12 via the 8-bit bidirectional highway 14.

Further included in the typewriter terminal are a plurality of indicators 28 for indicating various conditions, such as "Stand-By," "Send-Ready," "Message-Received," and the like. The indicators are controlled by signals such as IND0–IND5 derived from the processor 12 and outputted to the indicators 28 via a 9-bit bus 30 from controller 10. The controller includes an arrangement for enabling certain indicators (2, in the example described below) to be "blinked" in order to alert the operator to a special condition (e.g., "Overflow").

As indicated above, the input-output information on highway 14 may be control signals specifying a control operation, or may be data signals involved in a data-transfer operation. Described below are a number of examples of control and data-transfer operations that may be specified by the processor. One example of a data-transfer operation is a WRITE operation, wherein indicator data is transferred from the processor to the indicators 28 of the typewriter terminal; another example is a READ operation wherein keyboard character entries are transferred from the typewriter terminal to the processor. All data-transfer operations from or to the processor 12 and the typewriter console are effected via the controller 10.

Figure 2:
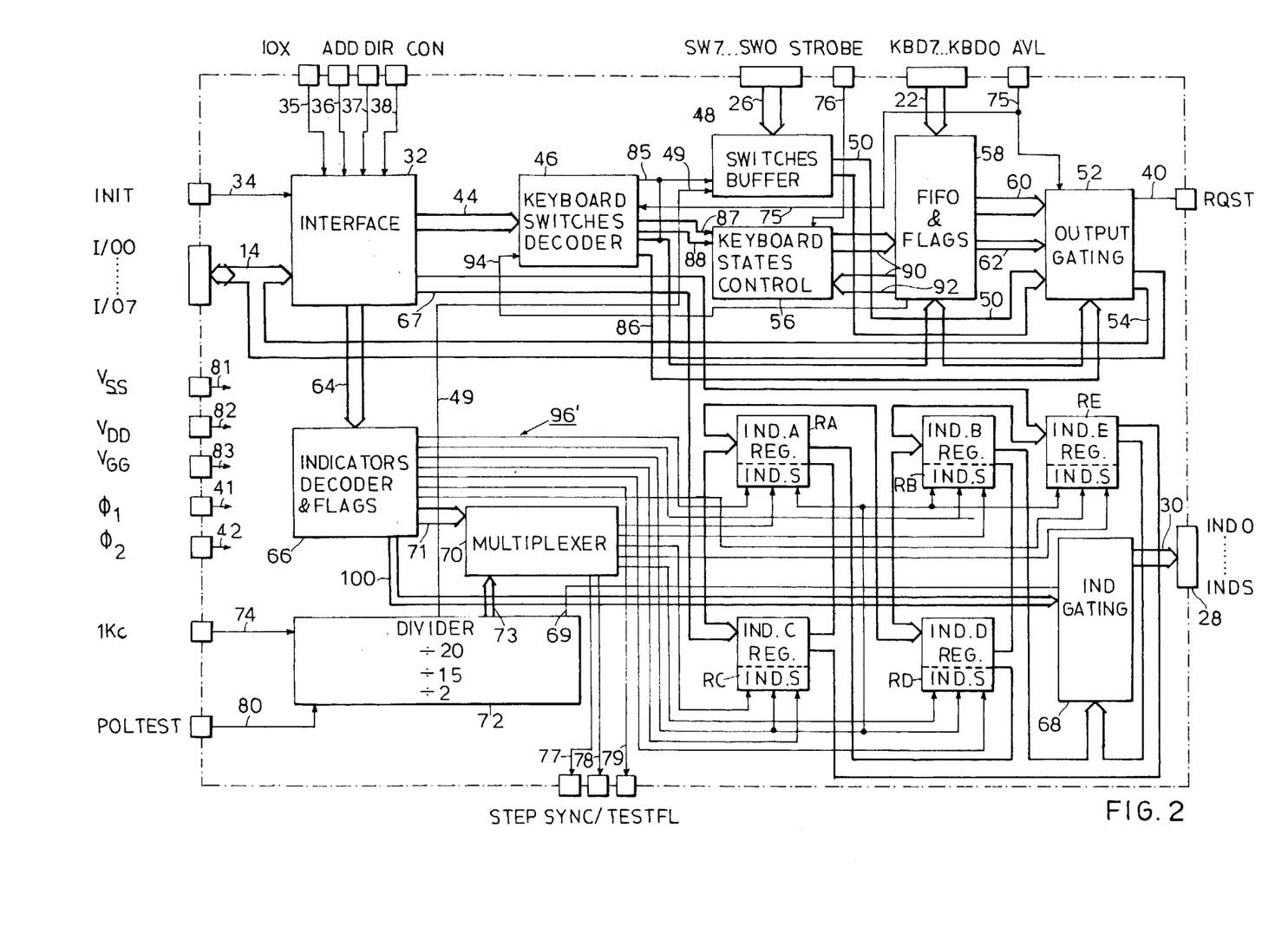
FIG. 2 is a more detailed block diagram illustrating the main components of the controller of FIG. 1.

FIG. 2 illustrates more particularly the general layout of the controller 10 including the above-mentioned inputs and outputs.

As shown in FIG. 2, the bidirectional 8-bit highway 14, tramsmitting the 8-bit input/output signals I/00–I/07 between controller 10 and processor 12 is connected to an interface 32. This interface has a number of other input lines for various control signals, as follows:

INIT (line 34), which is the initializing signal for the controller 10 of the typewriter terminal;

IOX (line 35), which provides the time-slot for information transfer to the particular terminal controller;

ADDR (line 36), which specifies the address of the particular controller; and

DIR (line 37), and CON (line 38), which together define the nature of information transferred via the bidirectional bus 14, e.g., READ, WRITE, INTERROGATION and CONTROL, as set forth for example in Table 1 described below.

Figure 3:
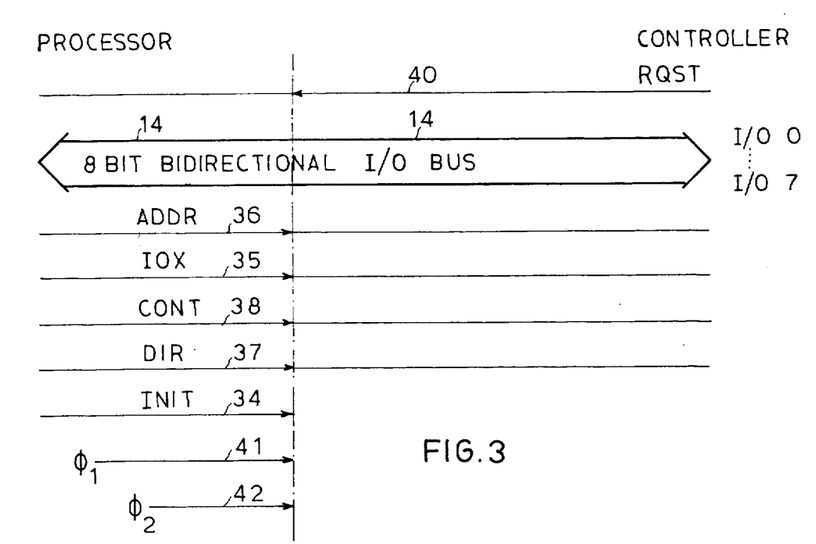
FIG. 3 is a diagram illustrating the main inputs and outputs between the processor and controller.

FIG. 3 diagrammatically illustrates the foregoing inputs to interface 32 of controller 10, and the following additional control lines:

RQST (line 40), which is an output signal from controller 10 to processor 12 indicating (when at a "1" level) that one character can be read out from the output stage of the FIFO buffer; and $\phi_1$ (line 41) and $\phi_2$ (line 42), which are two-phase-clocks (e.g., 250 KHz) controlling various timing functions; (e.g., $\phi_1$ is the strobe clock and $\phi_2$ is the validation clock frequently used in MOS circuitry).

As shown in FIG. 2, interface 32 outputs information via a 15-bit bus 44 to a decoder circuit 46 which decodes same and controls the flow to processor 10 of the keyboard character data KBD0–KBD7 and the keyboard switches data SW0–SW7, as follows:

Some of the information from interface 32 which is decoded in decoder 46 is fed to a switches-buffer 48 which receives the data SW0–SW7 inputted from the keyboard switches 24. The latter data are fed from buffer 48 via an 8-bit bus 50 to an output gating circuit 52, and from there, they are fed to the processor 12 via an 8-bit bus 54 and the bidirectional highway 14 linking the processor with interface 32 of the controller.

Other information from interface 32 decoded in decoder 46 is fed to a keyboard-states-control system 56 which controls a First-In-First-Out (FIFO) buffer storage 58 for the keyboard data signals KBD0–KBD7 inputted from the keyboard via bus 22. The FIFO buffer 58 can store up to four characters and includes an arrangement of flags such that if a fifth character is attempted to be inputted while the buffer is full, an "Overflow" condition results. Further keyboard entries will not be accepted by the buffer until the "Overflow" condition is cured, but the condition is signalled to the operator to permit the re-introduction of character that might otherwise be lost. The structure and operation of FIFO buffer 58 and its associated flags are described more particularly below with respect to FIGS. 6–8. The outputs from the FIFO buffer 58 and its associated flags are fed to output gating circuit 52 via an 8-bit bus 60 and a 4-bit bus 62, respectively, and from the gating circuit to the bidirectional 8-bit highway 14 linking processor 12 with controller 10.

The data for driving the indicators 28 is derived from the processor and is fed to the controller via the 8-bit highway 14 and interface 32. Some data relating to the selection of the indicators is outputted from interface 32 via a 14-bit bus 64 to decoder 66, which decodes same for use in controlling the outputting of the indicator data to the indicators. The indicator data itself is transferred from interface 32 via a 9-bit bus 67, and is stored in six indicator registers RA–RE and RS, which together are capable of storing up to 45 bits of information. Actually, there are five physical registers of 9-bits each; 8-bits of these five registers define the five registers RA–RE, while the 9th bit of each register defines the sixth register RS of 5-bits. The 8-bits of the five registers RA–RE are read out in parallel, whereas the 5-bits of register RS are read out in series.

The information is read-out from registers RA–RE and RS to the indicators 28 (FIG. 1) via a gating circuit 68, and appears as a 9-bit output signal INDO–INDS fed to the indicators. This read-out of the registers to the indicators 28 is controlled by a multiplexer 70. Multiplexer 70 is in turn controlled by decoder 66 via a 6-bit bus 71, and by a divider circuit 72 via a 4-bit bus 73. Circuit 72 divides a 1 Kc reference signal inputted via line 74 into a number of different-frequency timing signals for controlling the multiplexer, as will be described more fully below. Depending upon the instruction received from the processor via interface 32 and decoder 66, multiplexer 70 may be operated in any one of three different modes or cases, as described below, according to the number of indicators to be driven.

In addition to multiplexer 70, divided 72 also controls the timing of switches-buffer 48 via line 49, and the timing of the indicator gating circuit 68 via line 69.

Besides the signals to or from controller 10 briefly mentioned above, the controller receives or produces a number of other control signals shown in FIG. 2, as follows:

AVL is inputted on line 75 from the keyboard to the output gating 52, and indicates that a keyboard is electrically connected to the console;

STROBE is inputted on line 76 from the typewriter terminal to the keyboard-states-control system 56 and initiates the transfer of the keyboard characters (KBD0–KBD7) to the keyboard buffer 58;

STEP is outputted on line 77 and SYNC is outputted on line 78, both from the multiplexer 70 and enable the reconstruction externally of the multiplex sequence;

TESTFL is outputted on line 79 from a test flag TESTFL (FIG. 5) in decoder 66 for testing purposes;

POLTEST is inputted on line 80 from the typewriter terminal to divider 72, and provides a test input point for the controller; and $V_{SS}$ (line 81), $V_{DD}$ (line 82), and $V_{GG}$ (line 83) provide the supply and bias voltages for the controller circuitry.

The various components of the system and their functioning will now be more particularly described particularly with respect to one example of various instructions that may be issued by the processor to the controller.

2. Examples of Processor Instructions (Tables 1 and 2)

As mentioned earlier, the 8-bit bidirectional highway 14 linking processor 12 and controller 10 is useful for both control operations and data-transfer operations.

The DIR signal inputted on line 37, and the CON signal inputted on line 38 specify whether the operation is to be a control operation or a data-transfer operation, and if the latter, exactly which data-transfer operation is to be executed. Table 1 below sets forth for purposes of example a number of such operations that may be performed depending upon the DIR and CON signal levels on lines 37 and 38, respectively:

TABLE 1

| DIR (Direction) | CON (Control) | OPERATION |
|---|---|---|
| 0 | 0 | READ (Data transfer to the processor) |
| 1 | 0 | WRITE (Data transfer to the controller) |
| 0 | 1 | INTERROGATE (Status sent to the processor) |
| 1 | 1 | CONTROL (Command sent to the controller) |

In a "CONTROL operation," the processor issues an instruction to the controller via bus 14, which instruction is decoded and then executed by the controller. Table 2 below sets forth a number of such control operations for purposes of example, this table including the 8-bit code inputted by the processor via highway 14, the control signal produced by the controller after decoding same, and the operation performed by the controller in response to the respective instruction:

TABLE 2

| CONTROL SIGNAL | I/O BUS 14 INSTRUCTIONS OPERATION | 8-BIT CODE ON BUS 14 |
|---|---|---|
| KBSEL | - Select-Keyboard Enables logic to accept keyboard entries when no error condition exists | 1 0 0 1 0 0 0 1 |
| KBDS | - Deselect-Keyboard Disables keyboard entries; resets buffer control flags | 0 0 0 1 0 0 0 1 |
| RDID | - Prepare-To-Read-Identity Next READ instruction causes identity code (0000 0001) to be sent to processor | 0 1 0 0 0 0 0 1 |
| RDSW | - Prepare-To-Read-Switches Next read instruction causes status of switch inputs to be sent to processor | 0 1 0 0 0 0 1 0 |
| MUX 1 | - Preset-Multiplexer ASO (case 1) | 1 0 0 0 0 0 0 0 |
| MUX 2 | - Preset-Multiplexer ASO-BS1 (Case 2) | 1 0 0 0 0 0 0 1 |
| MUX 3 | - Preset-Multiplexer ASO-BS1-CS2-DS3-ES4 (Case 3) Enable multiplexing of 9, 18 or 45 indicators (Case 1,2 or 3) | 1 0 0 0 0 0 1 0 |
| INDA | - Prepare-To-Load Indicator A | 0 0 1 0 0 0 0 0 |
| INDB | - Prepare-to-Load-Indicator B | 0 0 1 0 0 0 0 1 |
| INDC | - Prepare-To-Load-Indicator C | 0 0 1 0 0 0 1 0 |
| INDD | - Prepare-To-Load-Indicator D | 0 0 1 0 0 0 1 1 |
| INDE | - Prepare-To-Load-Indicator E | 0 0 1 0 0 1 0 0 |
| INDS | - Prepare-To-Load-Indicator S Cause the next WRITE | 0 0 1 0 0 1 0 1 |

TABLE 2-continued

| CONTROL SIGNAL | I/O BUS 14 INSTRUCTIONS OPERATION | 8-BIT CODE ON BUS 14 |
|---|---|---|
| | instruction to copy a data character into the specified indicator register (A--S) | |
| TESTFL | - Set-Test-Flag | 0 0 1 1 0 0 0 1 |
| TESTFL | - RST-Test-Flag | 0 0 1 1 0 0 0 0 |
| BLK1 | - Set-Blink AO (BLK AO) | 0 0 0 0 0 1 0 1 |
| BLK2 | - Set-Blink A1 (BLK A1) | 0 0 0 0 0 1 1 0 |
| BLK1, BLK2 | - Set-Blink AO (BLK,A0,A1) | 0 0 0 0 0 1 1 1 |
| $\overline{BLK1}$, $\overline{BLK2}$ | - Reset-Blink AO-A1 Cause a blink of bits 0 and/or 1 of Indicator Register A outputs | 0 0 0 0 0 1 0 0 |

The execution of some of these instructions is described below.

3. Keyboard-Switches-Decoder 46 (FIG. 4)

Figure 4:
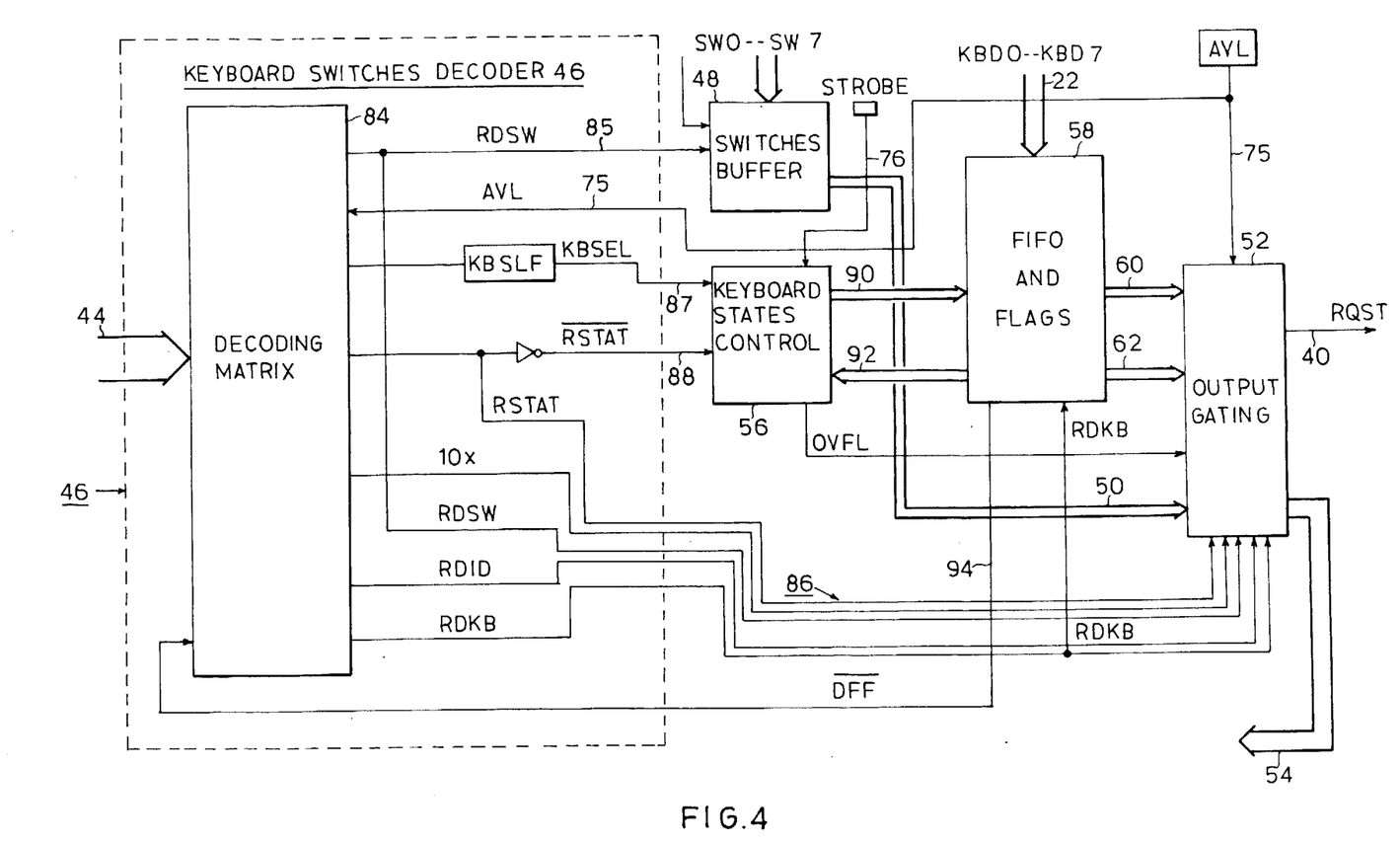
FIG. 4 is a block diagram illustrating more particularly the portion of the controller involved in decoding the instructions to read the keyboard character data and the keyboard switches data.

FIG. 4 more particularly illustrates decoder 46 for the keyboard data entries KBD0–KBD7 and the keyboard switch inputs SW0–SW7. As briefly mentioned earlier, decoder 46 receives the I/00–I/07 signal from the processor 12 via the 8-bit highway 14, interface 32, and the 15-bit bus 44; decodes the various instructions in respect to the handling of the keyboard switches data SW0–SW7 and the keyboard character data KBD0–KBD7; and then outputs the appropriate control signals to the various circuits for executing such instructions.

More particularly, and as shown in FIG. 4, decoder 46 includes a decoding matrix 84 which receives the I/00–I/07 code signal from processor 10 (via the bidirectional highway 14, interface 32, and bus 44), decodes it, and produces the control signals to execute the specified instruction (per Table 2) as follows:

The "Prepare-To-Read-Switches" instruction is decoded as signal RDSW on output line 85 and is transmitted to switches buffer 48. This signal is also transferred via bus 86 to the output gating circuit 52, to prepare same for reading the keyboard switch signals SW0–SW7. This instruction on highway 14 is accompanied by a CONTROL command (CON=1, DIR=1, Table 1) and is always followed by a READ instruction (CON=0, DIR=0, Table 1), at which time the actual reading of the keyboard switches is executed.

Figure 7:
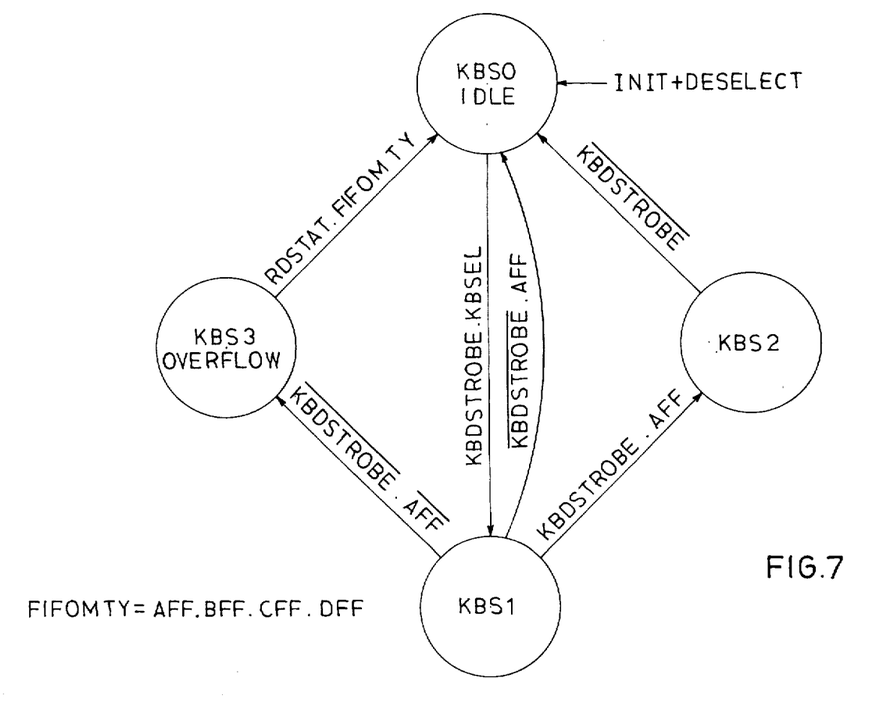
FIG. 7 is a state diagram illustrating the operation of the keyboard-states-control system of the controller.

The "Select-Keyboard" instruction is decoded in matrix 84 and sets a Keyboard-Select-Flag KBSLF which produces a KBSEL signal on output line 87. This signal, as described below with reference to the state-diagram of FIG. 7, is fed to the keyboard-states-control circuit 56 to enable the FIFO buffer 58 and associated flags to receive the keyboard data inputs KBD0–KBD7.

A "Read-Status" instruction results from an INTERROGATE instruction (DIR=0, CON=1, Table 1) as described below, and is decoded in matrix 84 as signal RSTAT. This signal is fed via bus 86 to the output gating circuit 52. The inversion of this signal (RSTAT) is fed via line 88 to the keyboard-states-control system 56, to reset the overflow condition as soon as the FIFO buffer is empty.

Bus 86 leading to gating circuit 52 is a 5-bit bus. In addition to the RDSW (Read-Switch) and the RSTAT (Read-Status) signals mentioned above, it also includes the controller Time-Slot signal IOX, the Read-Identity signal RDID, and the Read-Keyboard signal RDKB, all as decoded by matrix 84 from the information inputted into it from interface 32 via bus 44.

The FIFO buffer 58 is controlled by the keyboard-states-control system 56 via a single line 90 to the buffer, and two lines 92 from the buffer. The AVL ("Keyboard Available") signal coming from the keyboard via line 75 is fed to decoding matrix 84 enabling the operation of the Keyboard States Control 56 through KBSEL line 87. The AVL signal is also fed to the output gating 52 in order to report that status to the processor unit by means of an INTERROGATE instruction, which also reads out the OVFL (overflow) and OK status bits, as more fully described below.

Buffer 58 outputs a further signal ($\overline{DFF}$) to decoding matrix 84 via line 94; this signal indicates that the buffer has stored in it at least one character available for readout, as will be described more fully below, and enables the decoding matrix to issue a KDKB (Read-Keyboard) signal only when this condition is present.

The output gating circuit 52 controls the read-out from the FIFO buffer 58 to the processor 10 via the 8-bit bus 54 and highway 14. The output gating circuit 52 also controls the read-out from the switches buffer through the 8-bit bus 50.

4. Indicator-Decoder 66 (FIG. 5)

Figure 5:
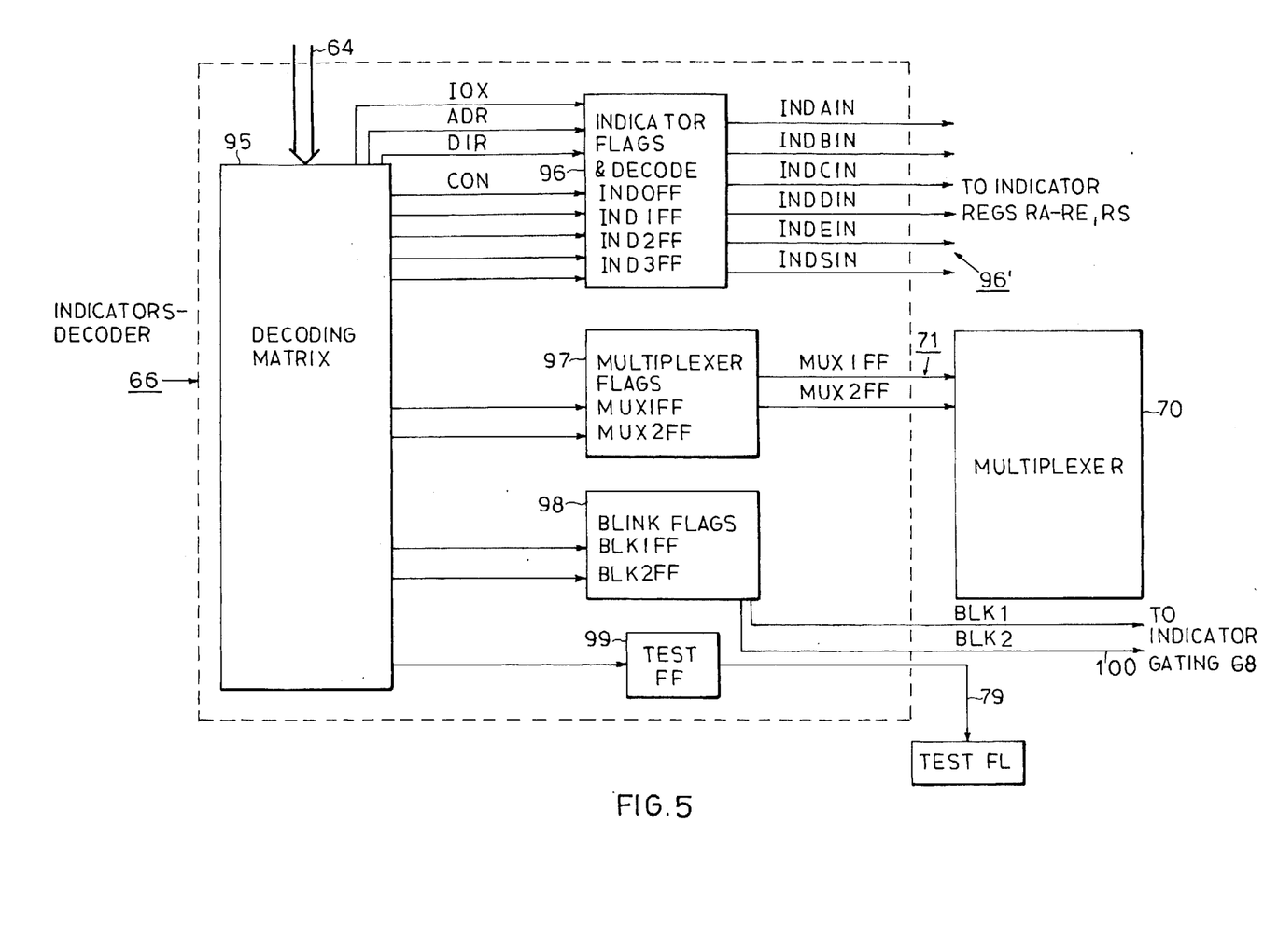
FIG. 5 is a block diagram illustrating more particularly the portion of the controller involved in decoding the instructions to handle the indicator data.

FIG. 5 illustrates the main components of decoder 66 which, briefly (a) receives indicator-instruction data from the processor 12 via bus 14, interface 32, and bus 64; (b) enables the indicator register (RA–RE, and RS) specified in the instruction, to receive the indicator data fed from the processor via the 8-bit bus 67; (c) controls multiplexer 70 to multiplex this data out of the registers to the indicator lamps 28 (FIG. 1); and (d) causes the blinking of one or two indicator lamps if so specified in the instruction from the processor.

Decoder 66 includes a decoding matrix 95, and a number of flags illustrated in blocks 96, 97, 98 and 99 (FIG. 5), as follows:

Block 96 includes four indicator flags, in the form of flip-flops INDOFF, IND1FF, IND2FF, and IND3FF, which receive the decoded instructions from the decoding matrix 95, and produce the six "Load-Indicator" control signals INDAIN, INDBIN, INDCIN, INDDIN, INDEIN and INDSIN. These signals are fed via lines 96' to the six indicator registers RA–RE and RS, respectively, and prepare them for loading (see Table 2).

Block 97 includes two multiplexer flags MUX1FF, MUX2FF, which memorize one of the three "Preset-Multiplex" instruction MUX1, MUX2, MUX3 (Table 2). These signals control multiplexer 70 via lines 71 and determine which one of three multiplexing modes will be used for driving the indicators (9, 18 or 45) according to the instruction received from the processor via the bidirectional highway 14, as will be described more particularly below.

Block 98 includes two blinking flags BLK1FF, BLK2FF, which memorize the "Set-Blink" or "RESET-BLINK" instructions (Table 2). These instructions are fed to the indicator gating circuit 68 via 2-bit bus 100, to cause the blinking ($\overline{BLK1}$, $\overline{BLK2}$), or to suppress the blinking (BLK1, BLK2) of selected indicators.

Lastly, block 99 includes the Test Flip-Flop TESTFF, which produces the TESTFL signal outputted at line 79 (FIG. 2) for testing the controller.

5. Keyboard Data and FIFO Buffer Control (FIGS. 6–9)

As indicated earlier, the keyboard character data KBD0–KBD7 inputted via bus 22 (FIGS. 1 and 2) is stored in the FIFO buffer 58 which is controlled by the keyboard-states-control system 56. The FIFO buffer includes a number of flags, one for each of its stages. The construction of the FIFO buffer and its associated flags is more particularly shown in FIG. 6; and the manner in which the buffer is controlled by the keyboard-states-control system 56 is illustrated in the state diagram of FIG. 7 and in the timing diagrams of FIGS. 8 and 9.

Figure 6:
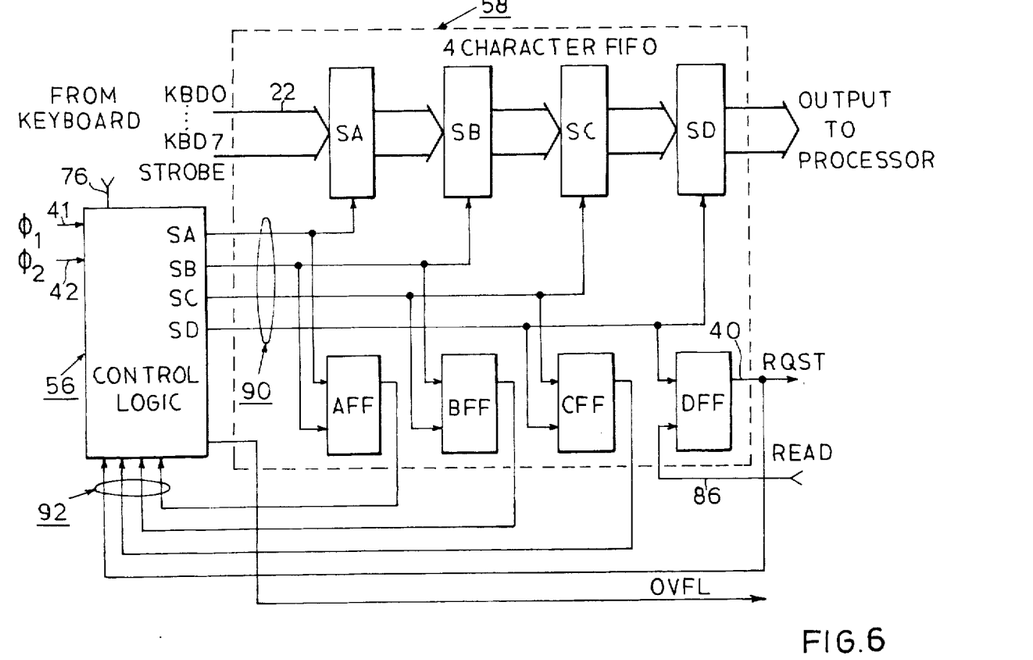
FIG. 6 is a block diagram illustrating the FIFO buffer and its associated flags.

As shown in FIG. 6, the FIFO buffer includes four stages, SA–SD, each stage being an 8-bit register adapted to store one byte or 8-bit character of the inputted keyboard data KBD0–KBD7. The read-in of each character into the buffer is effected by a STROBE pulse applied via line 76. The first character inputted is received in stage SA of the buffer, and is immediately shifted by clock pulses $\phi_1$, $\phi_2$ (lines 41, 42) through stages SB and SC to stage SD, assuming all these stages are empty. If stage SD or one of the lower stages is occupied at the instant a character is to be shifted to it, the shifting of the inputted character will stop at the highest vacant stage of the buffer before the occupied stage. The data is read-out of the buffer 58 from stage SD, so that as soon as stage SD becomes vacant, the characters stored in the earlier stages are immediately clock-shifted towards stage SD.

Referring now to FIG. 6 which illustrates the construction of the FIFO buffer 58 including its associated flags, it will be seen that each stage SA–SD of the buffer includes a flag AFF–DFF, respectively, which flags assume a condition corresponding to the condition of its respective buffer stage. In the described embodiment, each flag AFF–DFF is in a "set" (1) condition when its respective buffer stage is vacant, and in a "reset" (0) condition when its respective buffer stage is occupied. Thus, if all the stages of the FIFO buffer are vacant, all the flags AFF–DFF would be in their "set" conditions.

When the first character is inputted into the FIFO buffer, it is first received in stage SA, whereupon its flag AFF is reset. This character is then immediately shifted by the clock pulses $\phi_1$, $\phi_2$ through stages SB and SC to stage SD. As soon as the character is outputted from stage SA into stage SB, flag AFF becomes set (the stage-vacant condition), and flag BFF becomes reset (the stage-occupied condition). The same flag changes occur with respect to the remaining flags as the character is shifted by the clock pulses through the buffer to stage SD. At that time, assuming only one character has been inputted into the buffer, flag DFF is in its reset (stage-occupied) condition, while the other flags AFF, BFF and CFF are in their set (stage-vacant) conditions.

When the second character is inputted into stage SA of the buffer, it will be clock-shifted until a reset (stage-occupied) flag is sensed, at which time the shifting terminates so that the character is stored in the highest stage of the buffer in which the respective flag is in the set (stage-vacant) condition. In this case, the second character would be shifted to stage SC, since this is the highest stage of the buffer in which the respective flag (CFF) is in the set (stage-vacant) condition. When the third character is inputted, it will be shifted to stage SB, and when the fourth character is inputted, it will remain in stage SA. Thus, when all four stages of the buffer are occupied, all the flags will be in their reset (stage-occupied) conditions. This is the only time flag AFF will be in its reset condition, and this flag can therefore be used to indicate whether or not the buffer is full.

The state diagram of FIG. 7, which illustrates the operation of the keyboard-states-control system 56, shows the four states of the machine, arbitrarily designated KBS0, KBS1, KBS2, and KBS3; the paths taken when moving from one state to another; and the control signals required in order to change states. A dot between control signals signifies an "AND" condition is required; a "+" signifies an "OR" condition; and a bar over the control signal signifies a NOT condition is required.

As shown in the state diagram of FIG. 7, KBS0 is the idle state. This state is obtained either by a hardware initialization (INIT) signal inputted on line 34 (FIG. 2) or by the execution of a DESELECT keyboard instruction (KBDS, Table 2).

Assuming the keyboard of this particular terminal is selected (KBSEL instruction, Table 2), the system goes to state KBSI as soon as it receives a STROBE signal. In state KBS1, the logic waits for the input of a keyboard character KBD0–KBD7 into the buffer 58. If at least one character place is available in the FIFO buffer, manifested by the flag AFF being in its "set" (stage-vacant) condition as described above, the logic goes to state KBS2 with the next STROBE signal. The logic holds in state KBS2 until the end of the STROBE signal, and then immediately returns to the idle state KBS0.

The first character inputted into stage SA of the buffer is now automatically shifted by the clock pulses to the last stage of the buffer, namely stage SD. During this shifting of the character, the buffer flags are controlled according to the conditions of their respective stages. Each subsequent character is inputted and shifted in the same manner, the flags being similarly controlled to reflect the conditions of their respective buffer stages.

Figure 8:
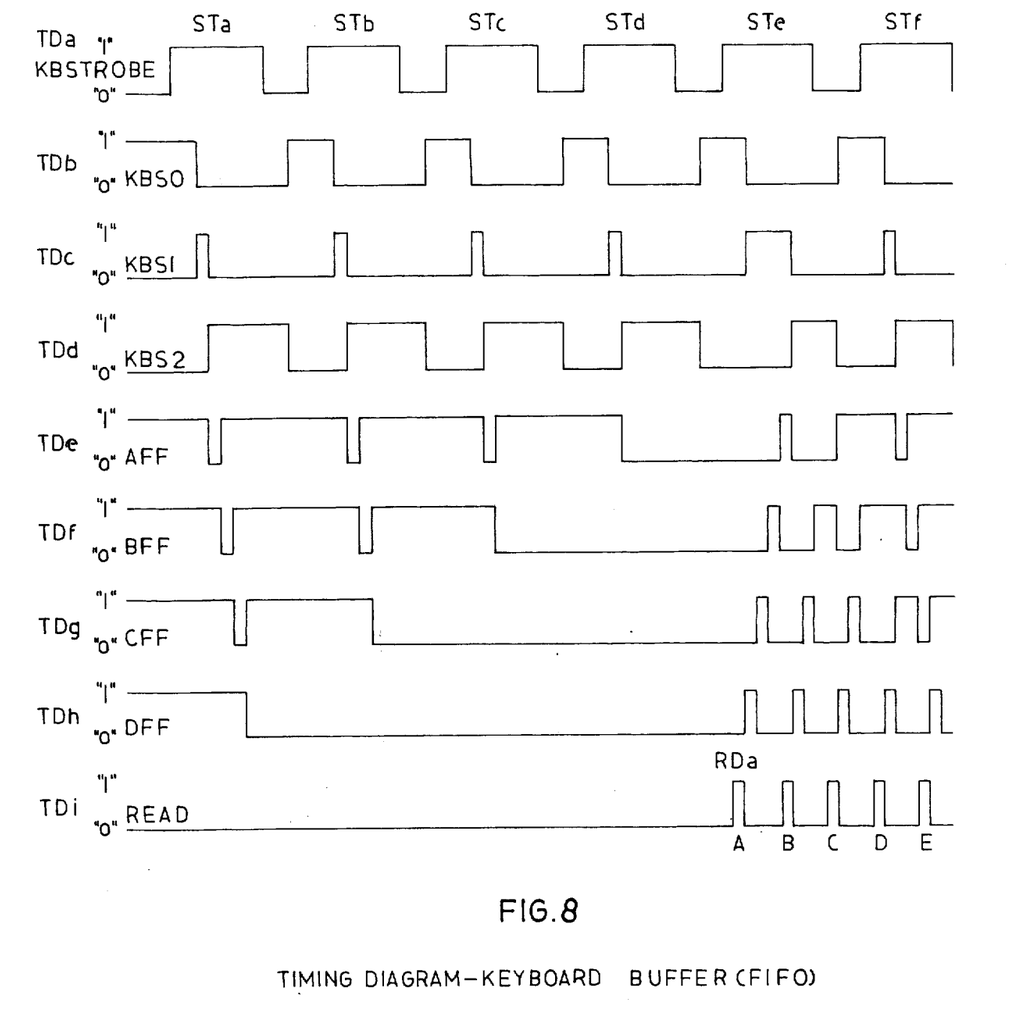
FIG. 8 is a timing diagram also illustrating the operation of the keyboard-states-control system of the controller.

The foregoing operation will be better understood by reference to timing diagrams of FIG. 8. In these diagrams, the STROBE pulses are identified as STa–STf and are shown in timing diagram TDa. The keyboard stages KBS0, KBS1 and KBS2 are illustrated by timing diagrams TDb, TDc, TDd, respectively. The conditions of the buffer flags AFF–DFF are illustrated in timing diagrams TDe–TDh; and the READ instruction issued by the processor to read-out the contents of the buffer from the last state (SD) is illustrated in timing diagram TDi.

It will thus be seen that as soon as the first STROBE signal STa is detected, the logic goes from the idle state KBS0 (TDb) to state KBS1 (TDc). It stays in this state until the character is transferred to the first stage SA of the buffer, whereupon flag AFF (TDe) of that stage becomes "reset" (0) to signify that the state is occupied. As soon as the transfer is completed, the logic goes to state KBS2 (TDd), and remains in that state until the end of the STROBE pulse STa.

Before the STROBE pulse ends, the character stored in buffer stage SA is immediately shifted by the clock pulses. First, it is shifted to stage SB, whereupon flag BFF becomes "reset" (TDf), while flag AFF returns to the "set" condition; then to stage SC, whereupon flag CFF becomes "reset" (TDg), while flag BFF becomes "set"; and then to stage SD, whereupon flag DFF becomes "reset" (TDh), while flag CFF becomes "set."

Thus, well before the first STROBE pulse STa has terminated, the first character inputted into the first stage SA of the buffer has been clock-shifted to the last stage SD.

The same series of events occur as the next character is inputted into stage SA of the buffer with the next STROBE pulse STb, this character being clock-shifted to the highest vacant stage as determined by the condition of the respective flag, which is stage SC in this case. The third character is introduced with the third STROBE pulse STc and is shifted in the same manner to stage SB; and finally, the fourth character is introduced with the fourth STROBE pulse STd but remains in stage SA.

Noise is rejected by the logic by causing the statesmachine to return from state KBS1 to the idle state KBS0 whenever no STROBE pulse is present and flag AFF is in its "set" (stage-vacant) condition. Thus, the information can be inputted into the buffer only with STROBE pulses present for a minimum of two clock cycles.

The information is read out from stage SD of the buffer by a READ instruction (TDi, FIG. 8) from the processor. As the character is read out from stage SD, the characters in the earlier stages are immediately clock-shifted towards stage SD. The foregoing is also shown in the timing diagrams of FIG. 8, wherein it will be seen that the first read-out pulse RDa first causes the last stage flag DFF to assume the stage-vacant condition, then flag CFF, then flag BFF, and finally flag AFF.

Figure 9:
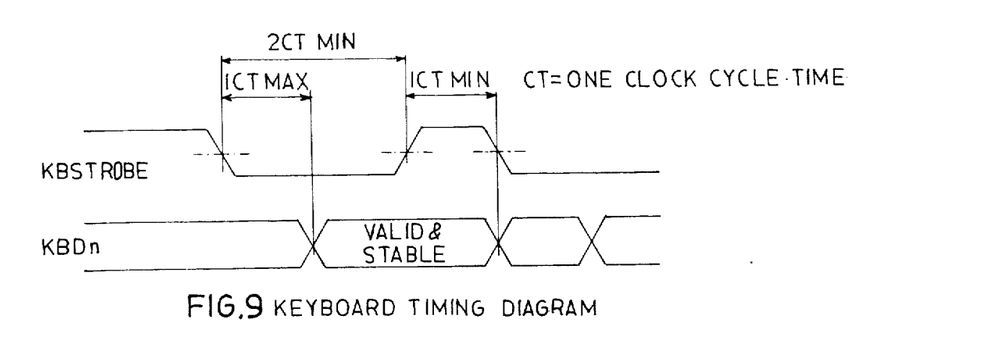
FIG. 9 is a keyboard timing diagram.

FIG. 9 illustrates the timing diagram of the STROBE pulses for introducing the characters into the buffer 58, and the clock pulses for shifting the characters successively from the first buffer stage to the last empty stage. It will be seen from the timing diagrams of FIG. 9 that the period of each STROBE pulse is substantially larger than that of each complete clock cycle for shifting a character from the first to the last stage of the buffer. In the described example, each strobe pulse is about 60 microsecs long, and the clock pulses are supplied at a rate of 250 KHz, i.e., about 4 microsecs. Higher clock rates, e.g., 1 MHg, can also be used.

From the foregoing, it will be seen that if flag AFF is in its "reset" or stage-occupied condition (signified by AFF in FIG. 7), the buffer is full and the state-machine will not move from state KBS1 to state KBS2 with the next STROBE pulse, but rather will move to state KBS3. This is the "Overflow" state of the machine. It is manifested by the generation of an overflow signal OVFL (FIG. 6), and no more keyboard entries will be accepted until this signal is deactivated.

As will be described more particularly below, the buffer issues a "true" RQST (Request) signal (FIG. 6) whenever, during a READ instruction, there is a valid character in the buffer, this being manifested by the last stage flag DFF being in its stage-occupied condition. The RQST signal remains "true" until the last character in the buffer is read-out, and then it will go "false". This causes the processor to issue an INTERROGATE instruction (Table 1) to the controller, in response to which the controller issues a Status Report informing the processor of the status of the terminal. If the overflow signal OVFL is generated, signifying the buffer had been in an "Overflow" condition, this is included in the Status Report as described below, thereby informing the processor and enabling it to indicate the condition to the operator, for example by "blinking" a selected indicator lamp. The operator is therefore able to reintroduce any character data that may have been refused by the buffer during the "Overflow" condition. The INTERROGATE instruction issued by the processor also deactivates the overflow signal OVFL and enables the entry of new data into the buffer.

In the state diagram of FIG. 7, it will be seen that the system stays in the "Overflow" state KBS3 until the buffer is empty (FIFOMTY signifying all flags AFF–DFF are in the stage-vacant condition), and a RDSTAT (Read-Status) signal is produced as a result of the INTERROGATE instruction. As soon as both of these have occurred, the system returns to its idle state KBS0.

The keyboard-states-control system 56 is a synchronous sequential machine which, as well known, can be defined as a logic network with outputs that are a function of the present output and of the previous sequence of inputs. A number of logic circuits may be used for such a system. Dynamic MOS LSI circuits are particularly advantageous, and since the techniques for designing such circuits are well known (being described for example in the book "MOS Integrated Circuits — Theory, Fabrication, Design and Systems Applications of MOS LSI," published by Van Nostrand Reinhold Co., New York, 1972, pages 288–306), it is not deemed necessary to describe a specific circuit here as this would merely unduly lengthen the description.

The various flags used in the controller may also be of MOS LSI circuits, such as quasi-static flip-flops as described in pages 254–260 of the above book.

6. Keyboard-Switches Control

The data signals SW0–SW7 from the keyboard switches 24 (FIG. 1) are inputted via bus 26 to the switches-buffer 48 (FIG. 2), where the data is stored after the release of the respective switch. Buffer 48 is read-out by the RDSW signal inputted from decoder 46 via line 85 (FIGS. 2, 4) when the respective Prepare-To-Read-Switch and Read instructions (Table 2) have been received from the processor via highway 14 and interface 32.

The Prepare-To-Read-Switch instruction would be followed by a READ instruction (DIR=0, CON=0, Table 1), at which time the 8-bit information SW0–SW7 from the keyboard switches would be passed by buffer 48 to the processor 12 via 8-bit bus 50, output gating circuit 52, bus 54, and the bidirectional highway 14.

Figure 10:
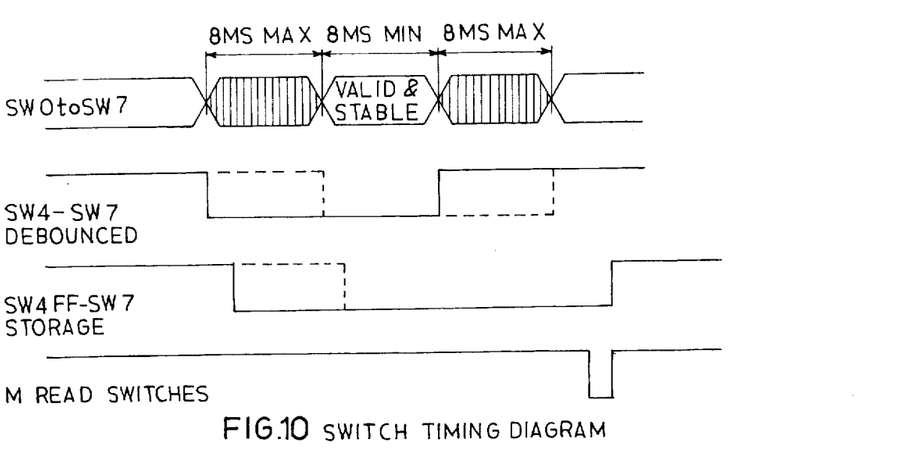
FIG. 10 is a switch timing diagram.

As indicated earlier, the eight keyboard switches 24 (FIG. 1) may be toggle and/or pushbutton switches on the typewriter keyboard. In one application, there are four pushbutton switches. FIG. 10 is a timing diagram illustrating the switch operation. The effects of contact bounce on the logic are eliminated internally as long as the total transient duration is shorter than 8 msec. The pushbutton switch information is stored in the switches buffer 48 even after the pushbutton has been released, buffer 48 being reset once the information has been read-out by the processor.

7. Control of Indicators 28 and Multiplexer 70

As indicated earlier, the system illustrated is capable of driving up to 45 indicators 28 (FIG. 1) these being accommodated by the five registers RA–RE of 8-bits each, and the sixth register RS of 5-bits constituted by the 9th bit of RA–RE. In order to drive the indicators, a selected register is first enabled by the appropriate Prepare-To-Load-Indicator instruction from the processor, and then the indicator data (derived from a register in the processor) is transmitted to the enabled indicator register. The data stored in the indicator registers are multiplexed by multiplexer 70 as 9-bit output signals INDO–INDS to the indicators 28 (FIG. 2).

More particularly, the processor issues a Prepare-To-Load-Indicator instruction specifying the selected indicator, per Table 2 above. This instruction is fed via the bidirectional highway 14 and interface 32 to the indicators-decoder 66, where it is decoded by decoding matrix 95 (FIG. 5) and sets the indicator flags 96 according to the indicator register selected.

The next instruction issued by the processor would be a WRITE instruction wherein the indicator data is transmitted via bidirectional highway 14, interface 32, and 8-bit bus 67 (FIG. 2) to all the indicator registers, but only the enabled indicator register (RA in the above example) will store the indicator data. Thus, if indicator register RA is selected, a "high" signal is produced on the INDAIN line 96' to enable indicator register RA.

The data stored in the indicator registers are continuously multiplexed out as signals IND0–IND7 and INDS under the control of multiplexer 70 and the indicator gating circuit 68.

While the system can drive up to 45 indicators, it can also accommodate a fewer number. For this purpose, the multiplexer 70 may be operated according to any one of three different modes or cases, depending upon the number of indicators to be driven.

Case No. 1 applies when only 1–9 indicators are to be driven. In this case, the indicator information is not multiplexed, but rather the IND0–IND7 outputs are held connected to the 8-bits of indicator register RA, and the INDS output is held connected to bit "o" of indicator register RS. This case results when the MUX-IFF and MUXZFF multiplexer flags 97 of decoder 66 (FIG. 5) are both reset.

Case No. 2 is used when 10–18 indicators are to be driven. In this case, the indicator information is multiplexed between the two 8-bit registers RA and RB, as well as the two bits "0" and "1" of registers RS. This multiplexing sequence results when only the MUX1FF multiplexer flag 97 of decoder 66 is set.

Case No. 3 is used when 19–45 indicators are to be driven. In this case, the indicator information is multiplexed between all five of the 8-bit registers RA–RE, and the 5-bits of register RS. This multiplexing sequence results when the MUX2FF multiplexer flag 97 of decoder 66 is set.

To enable the reconstruction externally of the multiplex sequence (i.e., "external demultiplexing"), multiplexer 70 also generates the STEP and SYNC signals applied to output lines 77, 78, respectively (FIGS. 1 and 2).

The correspondence between the output signals STEP and SYNC, and the indicator outputs, for the above three multiplexing cases, is set forth in the following Table 3;

TABLE 3

| 1. No Multiplex | STEP | SYNC | A&S0 | B&S1 | C&S2 | D&S3 | E&S4 |
|---|---|---|---|---|---|---|---|
| (0–9 indicators) | 0 | 0 | OUT | — | — | — | — |
| 2. Multiplex AB | 0 | 0 | OUT | — | — | — | — |
| (10–18 indicators) | 1 | 0 | — | OUT | — | — | — |
| 3. Multiplex ABCDE | 1 | 0 | OUT | — | — | — | — |
| (19–45 indicators) | 0 | 0 | OUT | — | — | — | — |
|  | 1 | 0 | — | OUT | — | — | — |
|  | 0 | 0 | — | OUT | — | — | — |
|  | 1 | 0 | — | — | OUT | — | — |
|  | 0 | 0 | — | — | OUT | — | — |
|  | 1 | 0 | — | — | — | OUT | — |
|  | 0 | 0 | — | — | — | OUT | — |
|  | 1 | 1 | — | — | — | — | OUT |
|  | 0 | 1 | — | — | — | — | OUT |

Figure 11:
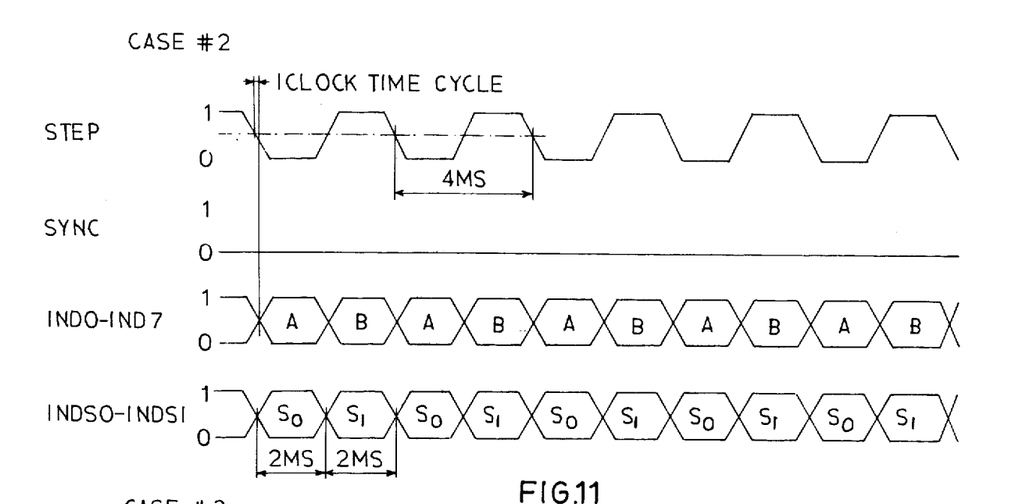
FIGS. 11 and 12 are indicator timing diagrams illustrating two multiplexer modes which may be selectively used for driving the indicators.
Figure 12:
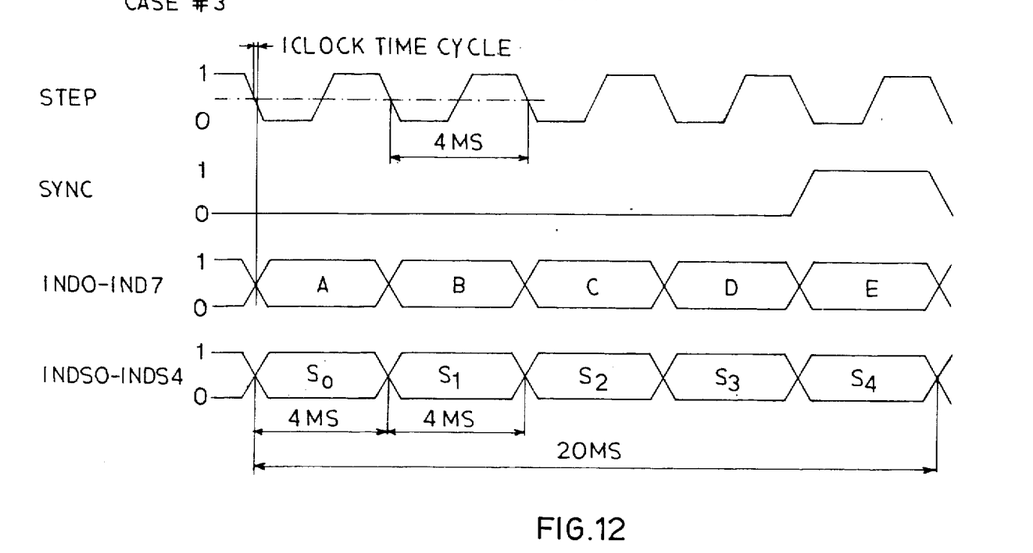

FIG. 11 illustrates the indicator timing diagram for the above Case No. 2, and FIG. 12 illustrates the timing diagram for Case No. 3. In Case No. 1, as indicated above, no multiplexing occurs since only up to nine indicators are being driven, and the nine indicators registers bits (8-bits of RA and "0" bit of RS) are sufficient without multiplexing.

It will be seen from the timing diagram of FIG. 11 relating to Case No. 2, that when only 10–18 indicators are driven, using only the two 9-bit indicator registers (8-bits provided by registers RA, RB, and the ninth bit by bits "0" and "1" of register RS), each of the two 9-bit registers is sampled for a period of 2 ms, each register being scanned once every 4 ms. On the other hand, when all five registers are being scanned according to Case No. 3 (FIG. 12), each is scanned for a period of 4 ms, and once every 20 ms. Thus, in the Case No. 2 (FIG. 11) multiplexing sequence for driving 10–18 indicators, the two indicators registers are scanned at a faster scanning rate but with shorter sampling periods than in Case No. 3 when all five registers are being scanned.

As indicated earlier, selected indicators may be "blinked" in order to alert the operator to special conditions, e.g., "Overflow." This is controlled by the instruction inputted from the processor via highway 14, interface 32, and decoder 66, which produces the appropriate output to the multiplexer 70. In our example, only two indicators have the capability of being blinked, these being the indicators driven by the "0"

and "1" bits of indicator register RA. When a "blink" instruction is received by decoder 66, which instruction also specifies the indicator to be blinked as set forth in Table 2 above, the decoder sets the blinking flags 98 (FIG. 5) to produce the appropriate output signal (BLK1, BLK2) to the indicator gating circuit 68 to cause the specified indicator to blink. The blinking is terminated by the appropriate instruction and signal ($\overline{BLK1}$, $\overline{BLK2}$) to reset the blinking flag, per Table 2.

Figure 13:
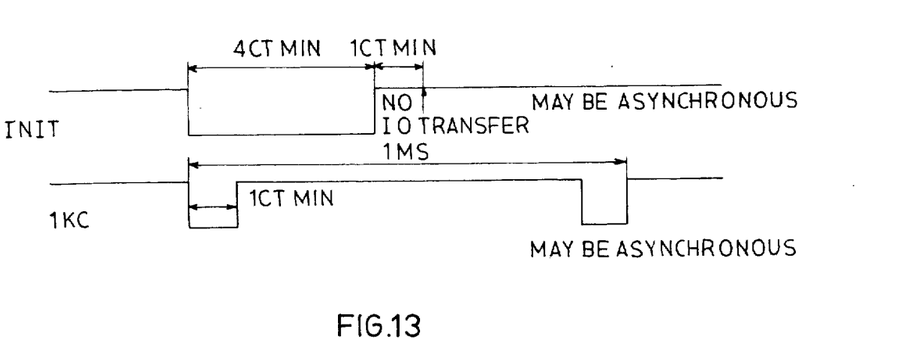
FIG. 13 is a further timing diagram illustrating the timing of two further signals involved in the operation of the controller.

The blinking frequency may be, e.g., 1.7 cps. This frequency is produced by divider 72 (FIG. 2) which receives the 1 KC reference signal (line 74, FIG. 2) and produces therefrom the various timing signals controlling the multiplexer 70 via bus 73, and the indicator gating circuit 68 via line 69. Divider 72 also produces the timing signal fed to switches buffer 48, via line 49, for controlling the sampling of the switch inputs SW0–SW7. The INIT signal used for hardware initializing may be an asynchronous signal. FIG. 13 is a timing diagram illustrating the above signals.

OPERATION OF THE PREFERRED EMBODIMENT

The illustrated preferred embodiment of the invention will be better understood by a description of the manner it executes a number of operations. Each operation to be executed is determined primarily by the 8-bit code signal I/100–I/07 (Table 2) inputted by the processor 12 via the bidirectional highway 14, and the two-bit DIR, CON signals (Table 1) inputted via the two-lines 37, 38. The latter signals, in addition to the time-slot (IOX) and address (ADD) signals, are all inputted into interface 32 (FIG. 2) of the controller. From there, they may be passed to the keyboard-switches decoder 46 or to the indicators-decoder 66, via buses 44 and 64 respectively, depending upon the specified operation. These decoders decode the inputs and produce the appropriate control signals to execute the specified operation in accordance with Tables 1 and 2 above.

Following is a description of a number of illustrative operations and the manner in which each is executed:

1. Prepare-To-Load-Indicator Operation

To execute this operation (e.g., for loading indicator A register RA), the processor 12 sends the following code signals to interface 32 of the controller 10:

| I/07--I/00 | (highway 14) | = 0 0 1 0 0 0 0 0 |
|---|---|---|
| DIR | (line 37) | = 1 |
| CON | (line 38) | = 1 |

The 2-bit code signal on lines 37 and 38 specifies a CONTROL command sent to the controller (Table 1), and the 8-bit code signal on highway 14 specifies a Prepare-To-Load-Indicator A operation (Table 2).

In this operation, the instruction is passed from interface 32 to indicator-decoder 66, where it is decoded by matrix 95 (FIG. 5) to set the indicator flags 96 such as to select indicator register RA by making INDAIN line 96' "high" at the next WRITE instruction.

Indicator register RA is thus enabled for receiving the information from the next instruction word. This must be a WRITE instruction, and is described in the following operation.

2. WRITE OPERATION

As indicated above, a WRITE instruction always follows a Prepare-To-Load-Indicator instruction, the "Prepare" instruction enabling a selected indicator register, and the WRITE instruction effecting the transfer of data from the processor to the so-enabled indicator register.

A WRITE instruction is implemented (per Table 1) by making DIR (line 37) = 1, and CON (line 38) = 0. The indicator data to be transferred is transmitted from the processor via the 8-bit bidirectional highway 14, interface 32, and the 8-bit bus 67 to all the indicator registers, but is actually stored only in the register enabled by the previous Prepare-To-Load Indicator instruction. Thus, in the example being described, the indicator data transferred by the processor is stored in the selected indicator register RA.

The multiplexer 70 is normally operating according to Case No. 3 above (wherein all the registers are being multiplexed to drive up to 45 indicators), this being the normal condition initiated by the INIT signal (line 34). If the multiplexer is to be operated according to another mode (e.g., Case No. 1 or No. 2), this must be specially programmed per Table 2 above.

Thus, when the selected indicator register (RA in our example) is scanned by the multiplexer, its contents are outputted via the indicator gating circuit 68 to the indicators 28.

3. Select-Keyboard and READ-Keyboard Operations

The manner in which the keyboard character data KBD0–KBD7 is stored in the FIFO buffer 58, controlled by the keyboard-states-control system 56, is described above with reference to FIGS. 6–9.

The Select-Keyboard instruction enables the controller to accept into its FIFO buffer 58 the keyboard entries KBD0–KBD7 via bus 22, and the subsequent READ-keyboard instruction effects a transfer of the keyboard data from the FIFO buffer to the processor, via output gating circuit 52, 8-bit bus 54, and the bidirectional highway 14.

The Select-Keyboard instruction is specified by the following inputs from the processor to interface 32 of the controller:

| I/07--I/00 | (highway 14) | = 1 0 0 1 0 0 0 1 |
|---|---|---|
| AVL | (line 75) | = 1 |
| DIR | (line 37) | = 1 |
| CON | (line 38) | = 1 |

The 8-bit signal on highway 14 specifies the Select-Keyboard instruction, per Table 2; the AVL signal received from the keyboard via line 75 specifies that the terminal being controlled does have a keyboard; and the DIR and CON signals specify a CONTROL command sent to the controller, per Table 1 above.

The 8-bit signal on bus 14 is transferred via interface 32 to the Keyboard-Switches-Decoder 46, wherein its decoding matrix 84 (FIG. 4) sets the Keyboard-Select-Flag KBSLF to produce the KBSEL signal fed via line 87 to the keyboard-states-control system 56. This enables the latter system for keyboard data entries and for subsequent READ-keyboard instructions from the controller to the processor.

A READ-instruction is now issued by the processor by making DIR=0 and CON=0 (Table 1). During a READ-instruction, the 8-bit signal on the bidirectional highway 14 consists of all "1"'s, which is the idle condition of the processor as mentioned above.

The keyboard-switches decoder 46 outputs from its decoding matrix 84 (FIG. 4) a RDKB (Read-Keyboard) signal which is fed via bus 86 to the FIFO buffer 58 and to the output gate circuit 52. The information in the FIFO buffer is thereupon read out via gating circuit 52, bus 54, and the bidirectional highway 14 to the processor.

As described earlier, during a READ instruction, the 8-bit signals on highway 14 from the processor are all "1"'s, this being the idle condition of the processor. Accordingly, when the information is read out of the FIFO buffer 58 in the manner described above, the 8-bits on highway 14 are forced to the states of the information being read-out of the FIFO buffer, and are thus received by the processor.

As also described earlier, the keyboard data KBD0–KBD7 inputted into the FIFO buffer 58 via bus 22 is received first in stage SA of the buffer, and is then automatically clock-shifted to stage SD, from which stage it is read out to the processor. The buffer flags AFF–DFF are caused to change states as their respective buffer stages are occupied, each flag being in the set (1) condition when its respective buffer stage is vacant, and being in the reset (0) condition when its respective buffer stage is occupied. Thus, if there is at least one valid character in the FIFO buffer 58, the last stage flag DFF would be in the stage-occupied condition.

This condition of flag DFF makes the RQST signal on line 40 (FIG. 6) "true", which signal is read by the processor when it reads the information stored in the FIFO buffer. If originally no information had been stored in the FIFO buffer, or if the information stored has all been read-out, flag DFF would be in its stage-vacant condition, and the RQST signal on line 40 would be "false". This terminates the READ operation and programmatically causes the processor to issue an INTERROGATE instruction.

4. INTERROGATE OPERATION AND EXAMPLE OF "OVERFLOW" CONDITION

As indicated earlier, the INTERROGATE operation is programmatically commanded by the processor as soon as RQST (line 40, FIG. 6) goes "false", thereby signalling the readout from the keyboard buffer 58 has been completed.

If during the previous READ operation, a STROBE pulse had been received while the buffer was full (manifested by flag AFF being in its stage-occupied condition), this would have resulted in setting the overflow flag OVFF (FIG. 6), signifying the "Overflow" condition and causing the buffer to refuse further characters from the keyboard (state KBS3 of the above-described state diagram of FIG. 7). As described earlier, the RQST signal on line 40 remains "true" during the read-out of the characters from the buffer until the last character is read-out (manifested by flag DFF going to its stage-vacant condition), at which time RQST goes "false" and causes the processor to command the INTERROGATE operation.

As shown in Table 1, an INTERROGATE operation is specified by the processor by the following signals:
DIR (line 37) = 0
CON (line 38) = 1

This command causes the controller to issue a Status Report, consisting of an 8-bit word, in which three bits (in our example) reflect the status of the keyboard as follows:

TABLE 4

| Bit 0 | logical 1 |
|---|---|
| Bit 1 | logical 1 |
| Bit 2 | logical 1 |
| Bit 3 | logical 1 |
| Bit 4 | NO OVERFLOW |
| Bit 5 | logical 1 |
| Bit 6 | AVAILABLE (POWER ON, KEYBOARD connected) |
| Bit 7 | OK |
| OK | = $\overline{\text{AVAILABLE.OVERFLOW}}$ |

Thus, if no "Overflow" condition has occurred in the FIFO buffer 58 in the manner described earlier, bit 4 of the Status Report would be a "1." Bit 6 is a "1" if the typewriter keyboard is available, i.e., if the power is "on" and the keyboard is connected; this bit is derived from the AVL signal inputted on line 75 (FIG. 2) as described above. Bit 7 is a "1" if the typewriter terminal is available and is not in the "Overflow" condition.

The Status Report issued by the controller to the processor in response to an INTERROGATE instruction will thus normally be an 8-bit word of all "1"'s. If however the controller had been in an "Overflow" condition, manifested by the overflow signal OVFL being "true," this condition would be signalled to the processor by bits 4 and 7 of the Status Report being "0" rather than "1".

In response to this signal, the processor may cause one of the indicators 28 to "blink," in the manner described below, thereby alerting the operator of the condition so that the operator can reintroduce any character which might otherwise be lost by its not having been accepted by the buffer.

The INTERROGATE operation also deactivates the overflow signal OVFL, enabling the entry of new data from the keyboard into the FIFO buffer 58.

5. PREPARE-TO-READ-SWITCHES AND READ-SWITCHES OPERATIONS

To execute these operations, the processor first issues a Prepare-To-Read-Switches instruction which is memorized by the interface buffer 32; and then issues a READ instruction which is interpreted accordingly by decoder 47 to effect the transfer of the data signals SW0–SW7 from the switches buffer, to the processor via bus 50, output gating circuit 52, bus 54 and the bidirectional highway 14.

The Prepare-To-Read-Switches operation is specified by the processor as follows:

| I/07--I/00 | (highway 14) | = 0 1 0 0 0 0 1 0 | (Table 2) |
|---|---|---|---|
| DIR | (line 37) | = 1 | (Table 1) |
| CON | (line 38) | = 1 | (Table 1) |

The next instruction is a READ instruction, effected in the same manner as described previously, namely by making DIR (line 37) = "0", and CON (line 38) = "0".

The instruction is fed via interface 32 and buss 44 to decoder 46, whereupon its decoding matrix 84 (FIG. 4) produces the RDSW signal on line 85 to the switches-buffer 48. This enables the buffer to receive the signals SW0–SW7 from the switches 24. The RDSW signal on line 85 is also fed via bus 86 to the output gating circuit 52, thereby enabling that circuit to read-out the information from the switches during the next instruction. The switch signals SW0–SW7 are now all read out in parallel to the processor via bus 50, output gating circuit 52, bus 54 and highway 14. The RDSW signal then resets the switches-buffer 48.

BLINKING OPERATION

As described above, one or two of the indicators may be "blinked" e.g., to alert the operator to a special condition such as "Overflow". In the described example, the indicators which have this capability of being blinked are the two indicators driven by the "0" and "1" bits of indicator register RA.

For example, to blink indicator AO, the processor would issue the following code signals:

| I/07--I/00 | (highway 14) | = 0 0 0 0 0 1 0 1 |
|---|---|---|
| DIR | (line 37) | = 1 |
| CON | (line 38) | = 1 |

From Table 2, it will be seen that the 8-bit code word on highway 14 specifies the Set-Blink-AO operation (to blink the indicator driven by the 0-bit of register RA), and the two control signals on lines 37 and 38 specify a CONTROL command sent to the controller.

The foregoing signals are fed via interface 32 to the indicators-decoder 66, whereupon the decoding matrix 95 (FIG. 5) of decoder sets the blinking flags 98 so as to produce the BLK1 signal. The latter signal is applied via bus 100 to the indicator gating circuit 68.

Accordingly, if there is a "1" in the indicator driven by the "0" bit of indicator register RA, as the latter information is multiplexed out to the indicators, that indicator will be blinked at the blinking frequency as determined by the signal on line 69 from the divider circuit 72, which as indicated earlier is about 1.7 cps.

To terminate the blinking of the selected indicator, the appropriate Reset-Blink instruction would be issued by the processor per Table 2.

While the invention has been described with respect to one preferred embodiment, it will be appreciated that many variations, modifications and other applications of the illustrated embodiment can be made.

What is claimed is:

1. A controller for linking a typewriter console to processor unit, the typewriter console having a keyboard including means for reading-out the keyboard data characters, said controller comprising:
    a storage buffer having a plurality of stages;
    a plurality of flags, one for each stage of the buffer;
    means for causing each flag to assume a first condition when its respective stage is occupied by a character, and a second condition when its respective stage is vacant of a character;
    means for supplying a series of strobe pulses and a series of clock pulses, the rate of clock pulses being many times faster than the rate of strobe pulses;
    means controlled by said strobe pulses for serially reading each keyboard data character into the first stage of the buffer to store same therein and to cause its respective flag to assume said first, stage-occupied, condition;
    means controlled by said clock pulses for continuously shifting the data character stored in the buffer towards the last stage of the buffer, to be stored in the highest stage of the buffer whose flag is in said second, stage-vacant, condition;
    means for serially reading out to the processor unit the stored keyboard data characters from the last stage of the buffer;
    and means preventing the entry of a character into the buffer and for providing an indication of an "Overflow" condition whenever a strobe pulse is received by the buffer while the flag of the first stage of the buffer is in said stage-occupied condition.

2. A controller according to claim 1, wherein each strobe pulse is of substantially larger duration than that of each complete clock cycle for shifting a character from the first to the last stage of the buffer.

3. A controller according to claim 1, further including means sensing the condition of the flag in the highest stage of the buffer, said latter means enabling the read-out from the buffer when said flag is in the stage-occupied condition, and terminating the read-out from the buffer when said flag is in the stage-vacant condition.

4. A controller according to claim 3, wherein said last-mentioned means, when the highest stage flag is in the stage-vacant condition, causes the controller automatically to inform the processor unit as to whether the typewriter console is in an "Overflow" condition with respect to said buffer.

5. A controller according to claim 1, further including decoder means for decoding a "Keyboard-Select" instruction from the processor unit enabling the read-in with a strobe pulse of a character from the keyboard into the first stage of the buffer.

6. A controller according to claim 5, wherein said decoder means further includes means for decoding a "Read" instruction from the processor unit to effect the serial read-out of the characters from the last stage of the buffer to the central facility.

7. A controller according to claim 1 for a typewriter console having a plurality of indicators, wherein said controller further includes means for energizing at least one of the indicators to indicate the "Overflow" condition, and means for causing said "Overflow" indicator to "blink" at a preselected frequency.

8. A controller according to claim 1 for a typewriter console having a plurality of indicators, wherein the controller further includes:
    a plurality of registers for said indicators;
    decoder means for decoding an "Enabling" instruction from the processor unit enabling a selected register and for decoding a subsequent "Write" instruction from the processor unit to effect a transfer of indicator data from the processor unit to the enabled register; and
    means for reading-out the data from said enabled register to the indicators.

9. A controller according to claim 8, wherein said last-named means includes a multiplexer for scanning the indicator registers and for reading-out their contents to the indicators.

10. A controller according to claim 9, further including multiplexer control means for selectively operating said multiplexer according to a first mode wherein the contents of only one register are read-out to the indicators, a second mode wherein only certain ones of said registers are scanned, or a third mode wherein all said registers are scanned.

11. A controller according to claim 10, wherein the multiplexer-control means includes means for causing the multiplexer to scan at a faster scanning rate and with shorter sampling periods when operated according to said second mode than when operated according to said third mode.

12. A controller according to claim 10, wherein said multiplexer-control means includes flags presettable by instructions from the processor unit in accordance with the selected multiplexer mode.

13. A controller according to claim 12, further including additional flags presettable by instructions from the processor unit for selectively blinking certain ones of the indicators.

14. A controller according to claim 13, further including a divider circuit receiving a single-frequency reference signal and producing therefrom a plurality of different-frequency timing signals controlling the multiplexing of the indicator registers, and the blinking of the selected indicators.

15. A controller according to claim 1 for a typewriter console having a plurality of switches, wherein said controller includes decoder means for decoding an "Enabling" instruction and a subsequent "Read" instruction from the processor unit to effect a read-out of the switches to the processor unit.

16. A controller according to claim 1, wherein the circuitry of the controller is formed on a single, LSI MOS chip.

17. A data processing system including a processor unit, a typewriter console, and a controller in accordance with claim 1 linking the typewriter console to the processor unit.

18. A plural-stage buffer for temporarily storing a plurality of data characters, comprising:

a plurality of flags, one for each stage of the buffer;

means for causing each flag to assume a first condition when its respective stage is occupied by a character, and a second condition when its respective stage is vacant of a character;

means for supplying a series of strobe pulse and a series of clock pulses, the rate of clock pulses being many times faster than the rate of strobe pulses;

means controlled by said strobe pulses for serially reading each data character into the first stage of the buffer to store same therein, and to cause its respective flag to assume said first, stage-occupied, condition;

means controlled by said clock pulses for continuously shifting each data character stored in the buffer towards the last stage of the buffer, to be stored in the highest stage of the buffer whose flag is in said second, stage-vacant condition;

means for serially reading out the data characters from the last stage of the buffer;

means providing an indication whenever a character is supplied to the buffer while the flag of its first stage is in said stage-occupied condition; and means preventing the entry of a character into the buffer, and also for providing an indication of an "Overflow" condition, whenever a strobe pulse is received by the buffer while the flag of the first stage of the buffer is in said stage-occupied condition.

* * * * *